United States Patent [19]

Graham

[11] Patent Number: 4,567,412
[45] Date of Patent: Jan. 28, 1986

[54] AUTOMATIC WIPER ACTUATOR FOR A VEHICLE WINDOW

[75] Inventor: Donald E. Graham, Centerville, Ohio

[73] Assignee: General Motors Corporation, Detroit, Mich.

[21] Appl. No.: 676,385

[22] Filed: Nov. 29, 1984

[51] Int. Cl.$^4$ .............................................. H02P 1/04
[52] U.S. Cl. ................... 318/483; 318/444; 318/484; 318/DIG. 2; 15/250 C
[58] Field of Search .............. 318/443, 444, 445, 449, 318/450, 483, 484, DIG. 2; 15/250 C

[56] References Cited

U.S. PATENT DOCUMENTS

| | | | |
|---|---|---|---|
| 3,826,979 | 7/1974 | Steinmann | 318/483 X |
| 4,001,676 | 1/1977 | Hile et al. | 324/60 CD |
| 4,065,715 | 12/1977 | Jaffe et al. | 324/60 CD |
| 4,065,721 | 12/1977 | Rabe | 328/1 |

FOREIGN PATENT DOCUMENTS

| | | |
|---|---|---|
| 2345546 | 3/1975 | Fed. Rep. of Germany ...... 318/483 |
| 2630470 | 1/1978 | Fed. Rep. of Germany . |
| 2105184 | 3/1983 | United Kingdom . |

Primary Examiner—William M. Shoop, Jr.
Assistant Examiner—Bentsu Ro
Attorney, Agent, or Firm—Robert M. Sigler

[57] ABSTRACT

A control system for a motor driven wiper on a vehicle window comprises a voltage generator effective to generate a first rectangular voltage wave having a substantially constant frequency and duty cycle and apparatus effective to derive two additional rectangular voltage waves from the first: a second delayed from the first by a first delay and a third delayed from the first by a second delay dependent upon the capacitance of a capacitor affected by moisture on the vehicle window. One of the second and third rectangular voltage waves may also be inverted. The three rectangular voltage waves are provided to the inputs of an AND gate having an output effective to trigger a retriggerable monostable multivibrator having an energized output period longer in duration than a cycle of the rectangular voltage wave to drive the wiper motor when the level of moisture on the window in the vicinity of the capacitor is sufficiently high. The first delay may be adjustable by the vehicle operator to vary the moisture sensitivity of the system. If the capacitor is placed within the wipe pattern just above the inner wipe postion, a fully automatic control may be provided.

1 Claim, 4 Drawing Figures

AUTOMATIC WIPER ACTUATOR FOR A VEHICLE WINDOW

This invention relates to window wiper systems for vehicles and particularly to such systems activated automatically in the presence of moisture on the window. A variety of such automatically controlled window wiper systems has been proposed in the prior art using a variety of sensors to indicate the presence of moisture on the window. One such sensor is a capacitive sensor mounted on the window in such a way that its capacitance changes greatly in the presence of moisture on the outer window surface. Such a sensor would appear to be relatively inexpensive to produce and could be placed in a relatively unobtrusive in part of the window. However, the capacitive element itself is a passive device and requires a good, inexpensive, reliable electronic circuit to form a complete sensor for inclusion in an automatic window wiper control system.

SUMMARY OF THE INVENTION

The invention comprises a control system for a motor driven wiper on a vehicle window in which an oscillator is effective to generate a rectangular voltage wave of supply and ground voltage levels having a substantially constant frequency and duty cycle; an inverter is effective to invert the rectangular voltage wave and apply the inverted rectangular voltage wave to the first input of a three input AND gate; first wave transformation means comprising a series diode and inverter with a first capacitor and a driver adjustable first resistor connected from the junction of the diode and inverter to ground is connected from the oscillator to the second AND gate input, whereby it applies to said input the rectangular voltage inverted and delayed by a first time period; second wave transformation means comprising a diode followed by two series inverters with a parallel second capacitor and second resistor connected from the junction of the diode and one of the series inverters to ground is connected from the oscillator to the third AND gate input; the second capacitor is located adjacent the wiped portion of the vehicle window and responsive in capacitance to the presence of moisture on said wiped portion, whereby the second wave transfomation means applies to the third AND gate input the rectangular wave delayed by a second time period varying with said capacitance and thus with the moisture on the window; a retriggerable monostable multivibrator is connected to the output of the AND gate and effective, when triggered by common supply voltage levels on all three inputs, to generate an energized output of period longer than a cycle of the rectangular voltage wave; and means are responsive to the energized output of the retriggerable monostable multivibrator to activate the motor driven wiper to perform a wipe cycle, whereby the wiper system is automatically activated in response to moisture on the windshield and is further adjustable by the vehicle operator in sensitivity to moisture.

The capacitive element is located adjacent the lower edge of the wiped portion of the vehicle window, where it will minimally obstruct vision and will be affected by the wiper action for automatic control, if desired, of pulse or intermittent wipe as well as continuous wipe.

Further details and advantages of this invention will be apparent from the accompanying drawings and following description of a preferred embodiment.

DESCRIPTION OF THE PREFERRED EMBODIMENT

Figure 1:
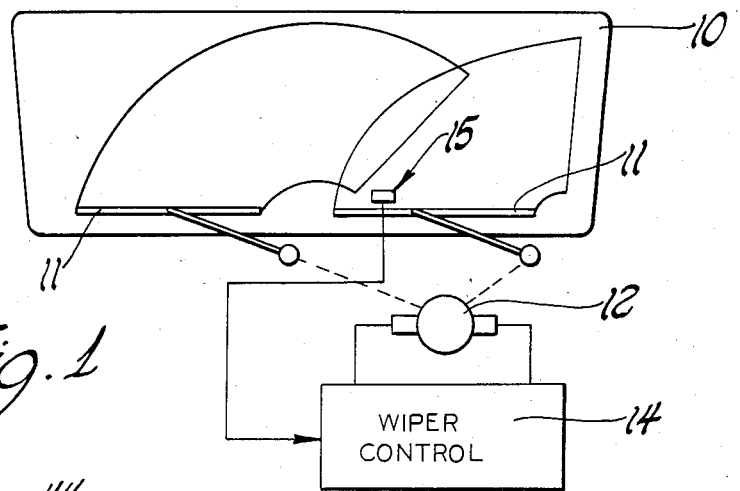
FIG. 1 is a schematic and block diagram of a motor driven wiper on a vehicle window with a control therefor.

Referring to FIG. 1, a wheeled motor vehicle, not shown, includes a front window or windshield 10 made of the sandwich-type safety glass normally used in such windshields and having associated therewith a pair of wipers 11 driven by an electric motor 12 controlled by a wiper control 14. A capacitive sensing element 15 is included with windshield 10 as shown, within the wiped area of the window just above the inner wipe position of the driver side wiper, and electrically connected to wiper control 14. The location of capacitor 15 is low on the glass, in an area of minimal annoyance to the vehicle operator.

Figure 4:
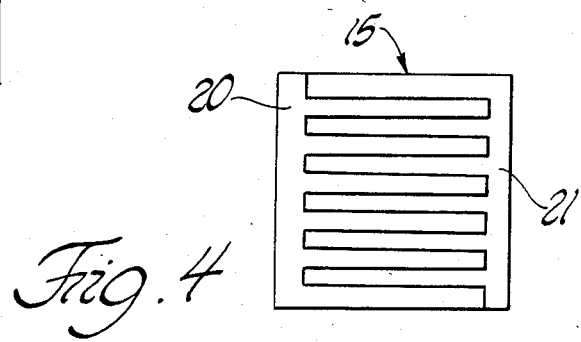
FIG. 4 shows a capacitive sensing element for use in the system of FIG. 1.

Capacitor 15 is shown in further detail in FIG. 4. It comprises two thin sheets 20, 21 of an electrically conductive material such as copper, wherein the sheets are mounted on a substrate adjacent each other in the same plane with laterally extending and interlocking fingers separated at all points by a dielectric material. The configuration of such a capacitor is shown in the prior art. Capacitor 15 is preferably mounted on the outer surface of windshield 10 or within windshield 10 between the outer glass layer and the adjacent middle plastic layer of the windshield. The closer capacitor 15 is located to the outer glass surface, the more the capacitance will vary with moisture on the outer glass surface; but if it is mounted on the outer glass surface it should be protected from wear or damage by a layer of protective dielectric material. Capacitor 15 has a certain predetermined capacitance when no moisture is present. However, when the window is coated with moisture, this capacitance changes greatly: as much as 100% with the capacitor on the outer glass surface.

Figure 2:
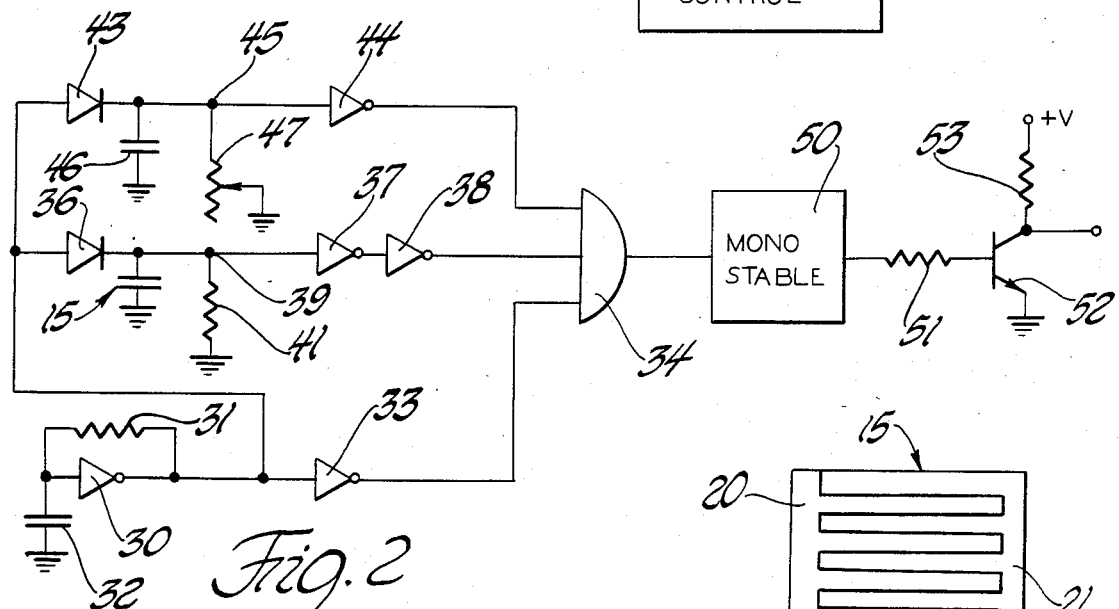
FIG. 2 is a circuit diagram of the wiper control shown in FIG. 1.

Capacitor 15 is included with wiper control 14, in the circuit diagram of FIG. 2. In FIG. 2, a rectangular wave oscillator comprises an inverter 30 with a feedback resistor 31 and a capacitor 32 connected from the input of inverter 30 to ground. The output of inverter 30 is the output of the oscillator and supplies a steady rectangular wave between a first voltage level, depending upon the supply voltage, and ground at a predetermined frequency of, for example, 200 Hz and duty cycle of, for example, 50 percent. This first rectangular wave is supplied through an inverter 33 to one input of an AND gate 34.

The first rectangular wave is transformed into a second rectangular wave and provided to another input of AND gate 34 through a diode 36 and two inverters 37, 38 in series. The junction 39 between diode 36 and inverter 37 is connected to ground through capacitor 15 and resistor 41 in parallel. The first rectangular wave is also transformed into a third rectangular wave and provided to a third input of AND gate 34 through a diode 43 in series with an inverter 44, the junction 45 between these elements being connected to ground through capacitor 46 and resistor 47. Resistor 47 may be of a variable resistance, as shown in FIG. 4, for developmental purposes or to provide the vehicle operator with control of the moisture sensitivity of the system.

The output of AND gate 34 is provided to a retriggerable monostable multivibrator 50 having an output pulse duration which, when triggered, is longer than the cycle period of the rectangular wave produced by the aforementioned oscillator. The output of monostable multivibrator 50 is provided through a resistor 51 to the base of a grounded emitter NPN transistor 52 having a collector connected to the vehicle power supply through a load resistor 53.

Operation of the system will be described with reference to the voltage waveforms of FIG. 3. Voltage waveform 60 represents the output of inverter 33 applied to an input of AND gate 34, assuming a 50 percent duty cycle for the rectangular wave. This is the inverted output of the oscillator. Waveform 61 shows the output of inverter 44 applied to another input of AND gate 34. This represents the output of the oscillator delayed by an RC time delay circuit comprising diode 43, capacitor 46, resistor 47 and inverter 44, which produces a delayed and inverted facsimile of the rectangular wave output of the oscillator. The time duration of the delay may be controlled by the resistance of resistor 47 and is normally adjusted to be less than one-half cycle of the frequency of the rectangular wave so that, as seen in the single cross-hatched area under waveform 61 in FIG. 3, there is a time during each cycle in which both waveforms 60 and 61 are at the high voltage level. When both these waveforms are applied to AND gate 34, the result is the equivalent of a reduction in the duty cycle from 50% to some smaller percentage figure controlled by the resistance of resistor 47.

The output of the oscillator is further provided in a delayed but uninverted form to the last input of AND gate 34 through the time delay circuit comprising diode 36, capacitor 15, resistor 41 and inverters 37, 38. It should be noted that, since an inverter is needed to help form the delayed waveform but no inversion is desired in this branch, two inverters 37, 38 are used in series. In this branch, the variable time delay is produced by the variable capacitance of capacitor 15 in response to the amount of moisture on the vehicle window. A typical waveform of this branch when capacitor 15 is not in the presence of moisture is shown as waveform 62. This represents a small time delay due to the small capacitance of capacitor 15; and, as can be seen from FIG. 3, the waveform falls from its high voltage to ground just before crossing the single cross-hatched area representing the common high voltage states of waveforms 60 and 61 and remains in its ground state until past the end of that single cross-hatched area. Thus, the three inputs of AND gate 34 do not all simultaneously go high at any point and the monostable multivibrator is not triggered. Therefore, transistor 52 remains in its off state and wiper motor 12 is not activated.

Figure 3:
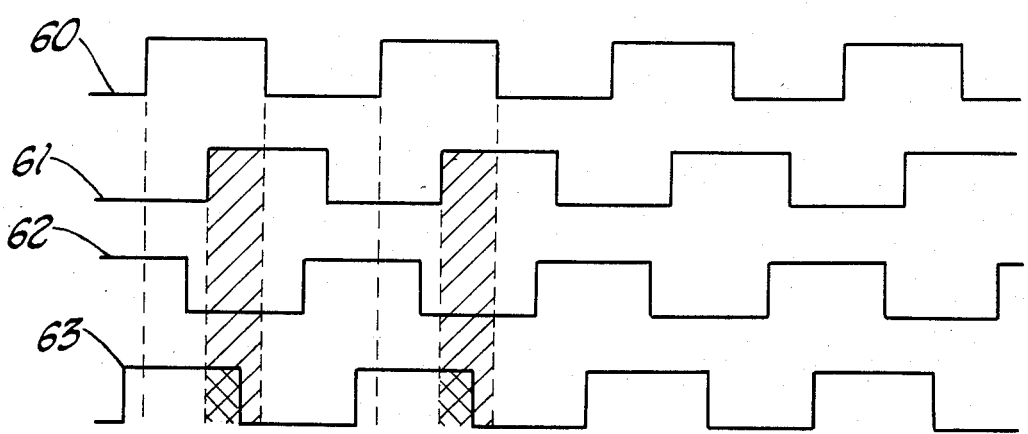
FIG. 3 shows a series of voltage waveforms, each corresponding to a different point in the circuit of FIG. 2.

However, the presence of moisture on the vehicle window adjacent capacitor 15 increases the capacitance and delays the passage of the rectangular wave through this branch of the circuit to produce voltage waveform 63 of FIG. 3. As can be seen from the double-cross-hatched area under waveform 63, there is a portion of time in each cycle wherein all three inputs of AND gate 34 are high and therefore a high triggering input is provided to monostable multivibrator 50. Since one such triggering input is provided each cycle and the output pulse duration of monostable multivibrator 50 is longer than one cycle, the output of multivibrator 50 will remain high as long as waveforms 60, 61 and 63 are present. Transistor 52 will thus remain turned on to activate motor 12 and drive wipers 11 through their predetermined paths.

A practical use of this control as described is in a wiper control with automatic selection of operational state from an off state through intermittent operation with progressively decreasing delay to continuous operation. Since capacitor 15 is included in the wiped area of the window, its capacitance will be reduced with each wipe of the wipers. The speed with which the capacitance increases again depends on the precipitation rate. In a light precipitation, the capacitance will still be low as the wipers reach their inner wipe position; and the motor 12 will be stopped for a delay period until the moisture level in the vicinity of capacitor 15 has increased sufficiently to retrigger another cycle. However, if precipitation is heavy, another cycle will be triggered almost immediately after the blade clears the area above capacitor 15; and wiper action will appear to be continuous. If precipitation has stopped, of course, the wipers will not be retriggered, since the glass will remain dry.

The preferred embodiment described in detail above and shown in the drawings is only one possible embodiment of this invention. For example, different capacitive sensors may be used, as may be determined by one skilled in the art. Other equivalents will occur to those skilled in the art; and this invention should therefore be limited only by the claim which follows.

The embodiments of the invention in which an exclusive property or privilege is claimed are defined as follows:

1. A control system for a motor driven wiper on a vehicle window comprising, in combination:
    an oscillator effective to generate a rectangular voltage wave of supply and ground voltage levels having a substantially constant frequency and duty cycle;
    an AND gate with three inputs and an output;
    an inverter effective to invert the rectangular voltage wave and apply the inverted rectangular voltage wave to the first AND gate input;
    first wave transformation means comprising a series diode and inverter with a first capacitor and first resistor connected from the junction of the diode and inverter to ground, the resistance of the first resistor being variably controllable by an operator of the vehicle, the first wave transformation means being connected from the oscillator to the second AND gate input, whereby it applies to said input the rectangular voltage inverted and delayed by a first time period;
    second wave transformation means comprising a diode followed by two series inverters with a parallel second capacitor and second resistor connected from the junction of the diode and one of the series inverters to ground, the second wave transformation means being connected from the oscillator to the third AND gate input, the second capacitor being located adjacent the lower edge of the wiped portion of the vehicle window and responsive in capacitance to the presence of moisture on said wiped portion, whereby the second wave transfomation means applies to the third AND gate input the rectangular wave delayed by a second time period varying with said capacitance and thus with the moisture on the window;

a retriggerable monostable multivibrator connected to the output of the AND gate and effective, when triggered by common supply voltage levels on all three inputs, to generate an energized output of period longer than a cycle of the rectangular voltage wave; and means responsive to the energized output of the retriggerable monostable multivibrator to activate the motor driven wiper to perform a wipe cycle, whereby the wiper system is automatically activated in response to moisture on the windshield and is further adjustable by the vehicle operator in sensitivity to moisture.

* * * * *